UNITED STATES PATENT OFFICE.

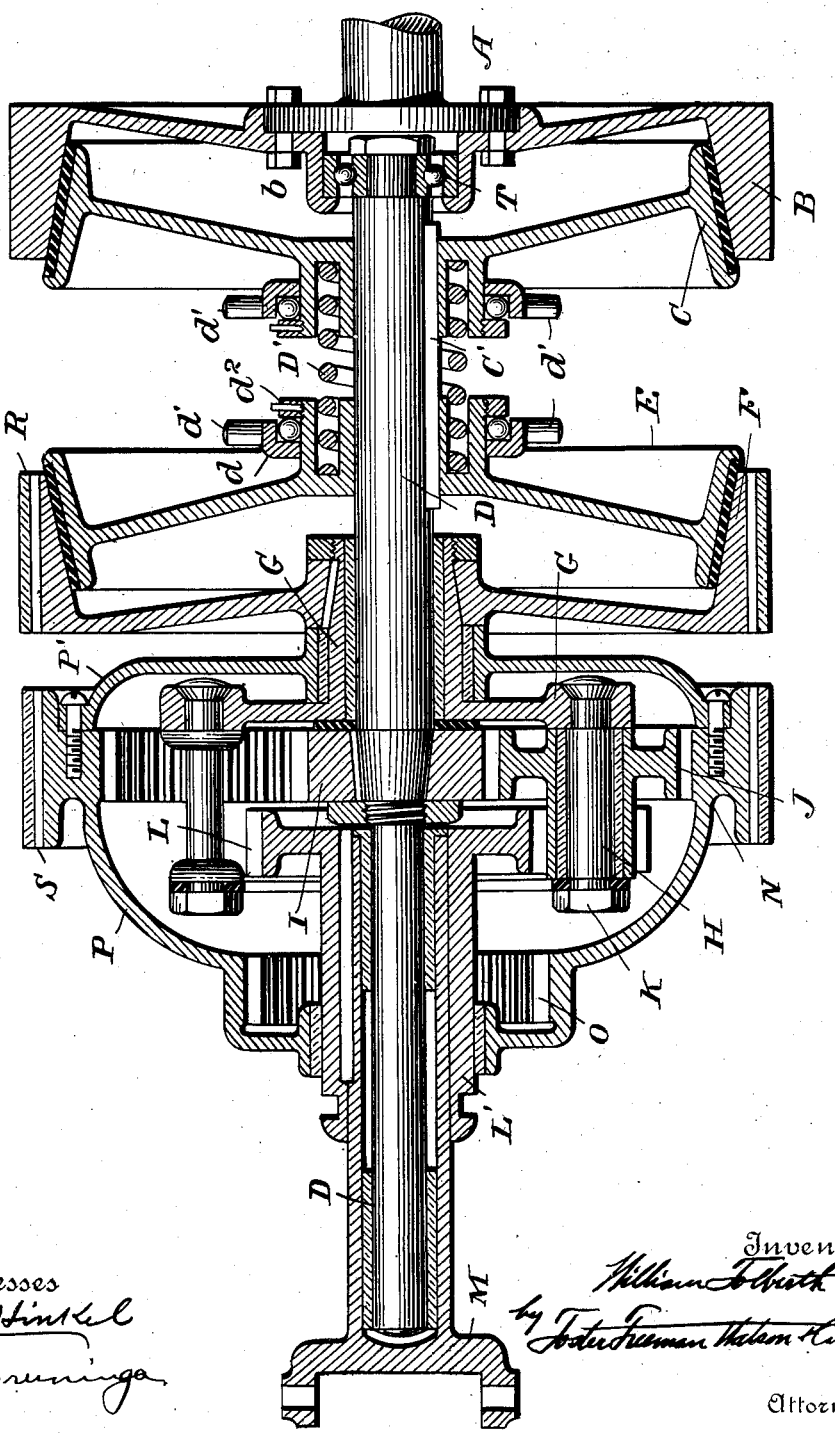

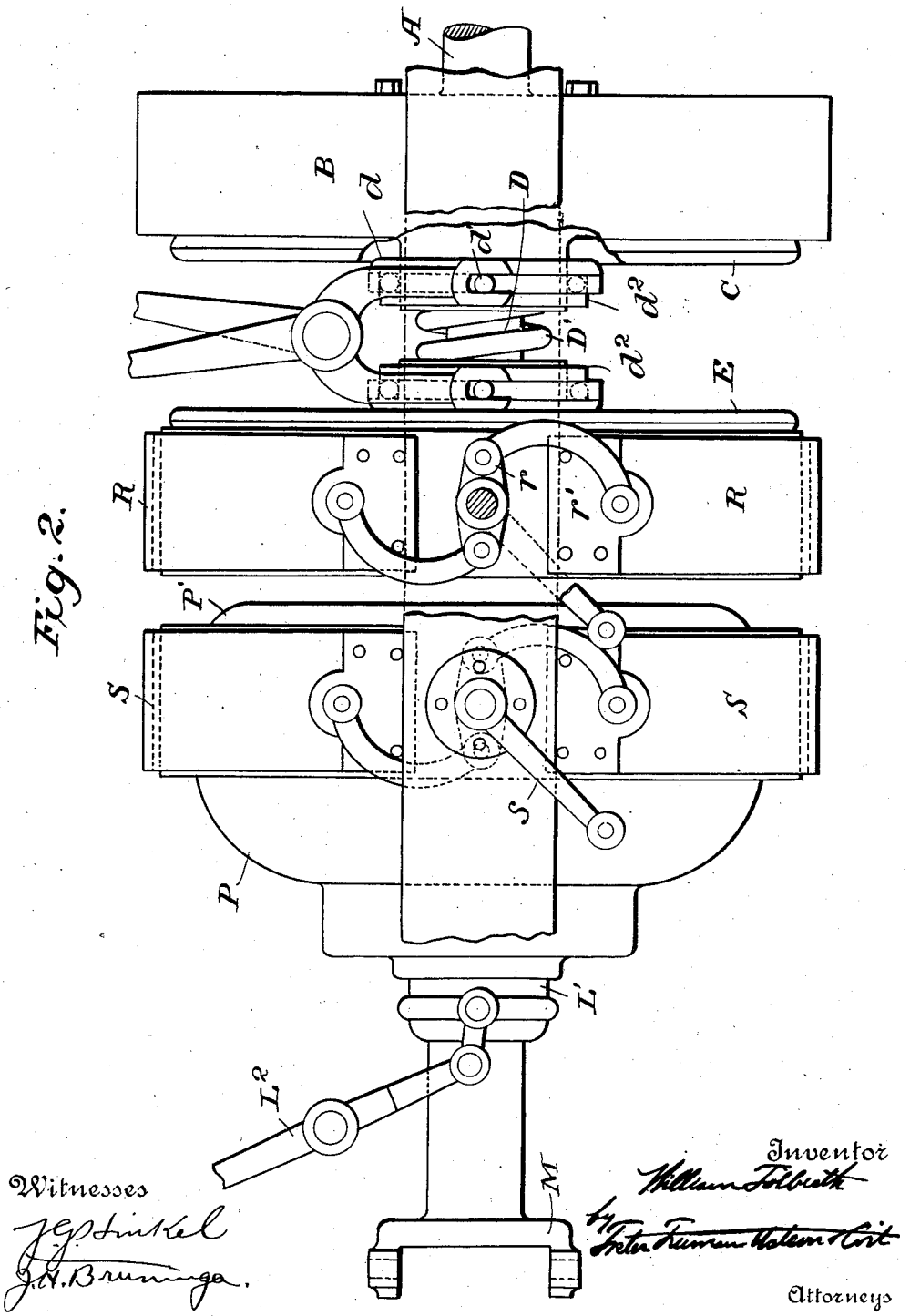

WILLIAM FOLBERTH, OF CLEVELAND, OHIO.

TRANSMISSION-GEARING.

953,992.  Specification of Letters Patent.  Patented Apr. 5, 1910.

Application filed July 12, 1906. Serial No. 325,882.

*To all whom it may concern:*

Be it known that I, WILLIAM FOLBERTH, a citizen of the United States, residing at Cleveland, Cuyahoga county, State of Ohio, have invented certain new and useful Improvements in Transmission - Gearing, of which the following is a specification.

The object of the present invention is to provide a transmission gearing for motor vehicles, comprising a minimum number of parts, which is adapted to drive a vehicle forward at either of three different rates of speed and also provide a reverse drive or means for driving the vehicle rearward.

The invention is illustrated in the accompanying drawings, in which,—

Figure 1 is a longitudinal sectional view through a transmission gearing constructed in accordance with the present invention; Fig. 2 is a plan view.

Referring to the drawings, A designates the engine or main driving shaft to which is rigidly connected the driving member B of a clutch, the other member C of which is connected by a suitable key C' with an intermediate shaft D arranged in line with the driving shaft A and the driven shaft M, from which the power is transmitted to the wheels of the vehicle by any suitable means, not shown. As shown, the shaft D is supported at one end by a ball bearing within a hub or boss $b$ on the inner face of the clutch member B, and the other end of said shaft extends into the driven shaft M which is made tubular. The intermediate shaft D serves as a support for the several parts of the differential gearing, which will be hereinafter described in detail, and which is adapted to be connected with the intermediate shaft by a clutch including a member E keyed to the shaft D so as to rotate therewith and also adapted to slide longitudinally thereon, said member coöperating with a second clutch member F secured to a sleeve G that is loosely supported on the shaft D. A spring D' surrounding the shaft D bears against the sliding members C, E, of the two clutches, and acts to hold them in engagement with the members B, F. With said sliding clutch members are connected levers $D^2$, $D^3$. As shown, each of said clutch members is provided with a hub on which is fitted a ring $d$ provided with an interior channel or groove in which are fitted suitable antifriction balls, and with oppositely arranged radially projecting pins $d'$ with which forks on the levers $D^2$, $D^3$ engage. Collars $d^2$ screwed on the hubs of the clutch members and held in position by suitable set screws act to retain the antifriction balls and rings $d$ in place.

The differential gearing, which, as aforesaid, connects the intermediate shaft D with the driven shaft M, comprises a casing P which is mounted to rotate about the axis of the shaft D and is provided with an internal gear N and an annular toothed clutch member O. As shown, this casing is mounted upon the sleeve G, and a sleeve L' keyed to the driven shaft. A pinion I is secured to the shaft D within said casing and through the member J of a two-part gear is connected with said internal gear N of the casing P. Said two-part gear is mounted on a shaft H which is supported in bearings carried by a spider provided with the sleeve G, which extends within the casing P; and the other member K of said two-part gear meshes with a gear L on the sleeve L' which, as above described, is keyed to the driven shaft M. By means of a lever $L^2$, the sleeve L' may be moved longitudinally of the driven shaft to cause its gear L to engage with either the member K of the two-part gear or the toothed clutch member O of the differential gear casing. To permit access to the differential gear, one wall P' of the casing P is made detachable, being shown as held in position by suitable screws.

A brake band R is arranged about the member F of the clutch by which the differential gearing is adapted to be connected with the intermediate shaft D, the ends of said band being suitably connected with a lever $r$ adapted to be turned through a controlling lever $r'$ to draw the ends of said band toward each other and hold the clutch member F and sleeve G with which it is connected stationary when desired. A similar brake band S surrounds the differential casing, and is adapted to be controlled through a lever $s$. When the band S is operated to clamp the casing P it will be held stationary and the member J of the two-part gear will travel upon the internal gear N of said casing.

The manner of adjusting the several parts to impart to the driven shaft M the desired speed and direction of rotation may be briefly described as follows: When the parts are in the position shown in Fig. 1, the gearing is adapted to propel the vehicle forward at its maximum speed, the clutch E, F, being operative and the brake bands R, S, being both disengaged. With the parts in this position, it will be seen that the sleeve G will be driven at the same speed as the intermediate shaft D, which in such case may be considered a driving shaft and the nonrotative two-part gear J, K, revolving with the shaft D will drive the gear L and driven shaft M at the same speed as that of the engine or driving shaft A. If it is desired to employ the slow or lowest forward speed, the clutch member E is withdrawn from engagement with the clutch member F and the brake band R is applied to hold the sleeve G stationary. The power of the engine or driving shaft is then transmitted through the clutch B, C, to the intermediate shaft D, and pinion I, rotating the two-part gear J, K, the supporting shaft H of which is held stationary by the action of the brake band R, and the driven shaft M is rotated at a speed considerably less than that of the shaft A. By releasing the brake band R and applying the other band S with clutch C in engagement and E unclutched a somewhat higher forward speed is obtained. With the parts in this condition, the pinion I drives the gear J at the same speed as the shaft D, but the gear L and driven shaft M are rotated at a higher speed than formerly because the gears L and K travel about the internal gear N. To effect a reverse drive, the sleeve L' is moved, longitudinally by means of the lever L², to disengage its gear L from the pinion K and cause it to engage the clutch member O, the brake band R being applied to hold the sleeve G stationary and the clutch E, F, being disengaged.

It will be seen that the entire transmission is very simple in construction. All of the gearing is included within the casing P and a single spring D' is employed for moving both of the sliding clutch members C, E, and further all of the parts are arranged in a compact and simple manner about a single shaft D. It will be evident also that the terms "driving" and "driven" shafts are used descriptively and under the assumption that power is applied to the shaft A, and that if the power is otherwise applied any one of the shafts referred to may be the driver.

What I claim is,—

1. The combination of a driving shaft, a driven shaft, a shaft intermediate said driving and driven shafts, a clutch for connecting the intermediate shaft with the driving shaft, a gear casing mounted to rotate about the axis of the intermediate shaft and provided with an internal gear and with a clutch member, a pinion mounted on the intermediate shaft within said casing, a twin gear supported to rotate about the axis of the intermediate shaft and having one member meshing with said pinion on the intermediate shaft and with the aforesaid internal gear, a gear mounted on the driven shaft and adapted to engage alternately either the other member of said twin gear or the aforesaid clutch member of the gear casing, means for holding said gear casing stationary, and independent means for preventing rotation of the twin gear relative to the intermediate shaft.

2. The combination of a driving shaft, a driven shaft, an intermediate shaft, a clutch for connecting the driving and intermediate shafts, a pinion mounted on the intermediate shaft, a sleeve supported by the intermediate shaft, a two-part gear carried by said sleeve, and having one member meshing with the pinion on the intermediate shaft, a gear on the driven shaft adapted to mesh with the other member of said two-part gear, a clutch for connecting said sleeve with the intermediate shaft, and means for holding said sleeve against rotation.

3. The combination of a driving shaft, a driven shaft, an intermediate shaft, a clutch connecting the intermediate and driving shafts, a gear casing mounted to rotate about the axis of the intermediate shaft, and provided with an internal gear and with a clutch member, a sleeve mounted on the intermediate shaft and having a portion extending into said gear casing, a two-part gear mounted on a shaft supported within said casing by said sleeve, one member of said two-part gear connecting the pinion on the intermediate shaft with the internal gear of said casing, a sliding gear mounted on the driven shaft and adapted to engage either the other member of said two-part gear or the clutch member of the gear casing, a clutch for connecting said sleeve with the intermediate shaft, and braking means for holding either the gear casing or said sleeve stationary.

4. In gearing, the combination with a driving shaft, of an axially alined driven shaft, a casing mounted for rotation about the axis of the shafts and provided with an internal gear and a toothed member, a gear on the driving shaft in driving connection with the internal gear, and a gear splined on the driven shaft constructed to be clutched with the toothed member.

5. In gearing, the combination with a driving shaft, of an axially alined driven shaft, a casing mounted for rotation about the axis of the shafts and provided with an internal gear and a toothed member, a gear on the driving shaft in driving connection with the internal gear, and a gear splined on the driven shaft constructed to be alternately clutched with the toothed member or into driving connection with the gear on the driving shaft.

6. In gearing, the combination with a driving shaft and a gear thereon, of an axially alined driven shaft, a casing mounted for rotation about the axis of the shafts and provided with an internal gear and a toothed member, a spider mounted upon the driving shaft, a gear thereon connecting the gear on the driving shaft and the internal gear, and a gear splined on the driven shaft constructed to be clutched with the toothed member, or into driving connection with the gear on the spider.

7. In gearing, the combination with a driving shaft, of a driven shaft sleeved thereon, a casing mounted for rotation on the shafts and provided with an internal gear and a toothed member, and gears on the driving and driven shafts in driving engagement with the internal gear and the toothed member.

8. In gearing, the combination with a driving shaft and a gear thereon, of an axially alined driven shaft, a casing mounted for rotation about the axis of the shafts and provided with an internal gear and a toothed member, a spider mounted upon the driving shaft, a gear thereon connecting the gear on the driving shaft and the internal gear, a gear splined on the driven shaft constructed to be clutched with the toothed member, or into driving connection with the gear on the spider, means for restraining and releasing the casing, means for restraining and releasing the spider, and means for clutching the spider into driving engagement with the driving shaft.

In testimony whereof I affix my signature in presence of two witnesses.

WILLIAM FOLBERTH.

Witnesses:
PERCY E. VARNEY,
O. W. HOFFMAN.